(12) United States Patent
Ojala

(10) Patent No.: US 8,380,333 B2
(45) Date of Patent: Feb. 19, 2013

(54) METHODS, APPARATUSES AND COMPUTER PROGRAM PRODUCTS FOR FACILITATING EFFICIENT BROWSING AND SELECTION OF MEDIA CONTENT AND LOWERING COMPUTATIONAL LOAD FOR PROCESSING AUDIO DATA

(75) Inventor: Pasi Ojala, Kirkkonummi (FI)

(73) Assignee: Nokia Corporation, Espoo (FI)

( * ) Notice: Subject to any disclaimer, the term of this patent is extended or adjusted under 35 U.S.C. 154(b) by 538 days.

(21) Appl. No.: 12/643,372

(22) Filed: Dec. 21, 2009

(65) Prior Publication Data

US 2011/0153043 A1 Jun. 23, 2011

(51) Int. Cl.
*G06F 17/00* (2006.01)
(52) U.S. Cl. .................................................. 700/94
(58) Field of Classification Search ............... 700/94; 381/17, 18, 21, 61, 119, 307, 309, 310
See application file for complete search history.

(56) References Cited

U.S. PATENT DOCUMENTS

| | | | |
|---|---|---|---|
| 6,011,851 A * | 1/2000 | Connor et al. ................ | 381/17 |
| 7,116,787 B2 | 10/2006 | Faller | |
| 2002/0151997 A1 | 10/2002 | Wilcock et al. | |
| 2006/0251263 A1 | 11/2006 | Vronay | |
| 2007/0021961 A1 * | 1/2007 | Oh ................................ | 704/273 |
| 2008/0229206 A1 | 9/2008 | Seymour et al. | |
| 2009/0046864 A1 | 2/2009 | Mahabub et al. | |
| 2011/0208331 A1 * | 8/2011 | Sandler et al. ................ | 700/94 |

FOREIGN PATENT DOCUMENTS

| | | |
|---|---|---|
| JP | 9 090963 A | 4/1997 |
| WO | WO2008/036950 A2 | 3/2008 |

OTHER PUBLICATIONS

Faller, et al., "Binaural Cue Coding—Part II Schemes and Applications," *IEEE Transactions on Speech and Audio Processing*, Nov. 2003, pp. 520-531, vol. 11, No. 6.
Breebaart, et al., "Parametric coding of stereo audio", *EURASIP Journal on Applied Signal Processing*, 2005, pp. 1305-1322, vol. 9.
Faller, "Parametric Multichannel Audio Coding: Synthesis of Coherence Cues," *IEEE Transactions on Audio, Speech, and Language Processing*, Jan. 2006, pp. 299-310, vol. 14, No. 1.
International Search Report and Written Opinion dated Mar. 29, 2011, of corresponding PCT Application No. PCT/FI2010/051069, filed Dec. 21, 2010.

* cited by examiner

*Primary Examiner* — Andrew C Flanders
(74) *Attorney, Agent, or Firm* — Alston & Bird LLP

(57) ABSTRACT

An apparatus for efficiently browsing and selecting media content and reducing computational load of processing audio data may include a processor and a memory storing executable computer program code that causes the apparatus to at least perform operations including obtaining audio signals corresponding to items of media data. The audio data associated with the audio signals is played simultaneously. The computer program code may cause the apparatus to determine whether audio signals correspond to multi channel audio signals when determining whether to generate simplified audio signals. The computer program code may also cause the apparatus to determine directions/locations to output the audio data associated with the audio signals. The determined directions/locations correspond to directions that media data is currently being moved or locations of the media data. Corresponding computer program products and methods are also provided.

23 Claims, 6 Drawing Sheets

METHODS, APPARATUSES AND COMPUTER PROGRAM PRODUCTS FOR FACILITATING EFFICIENT BROWSING AND SELECTION OF MEDIA CONTENT AND LOWERING COMPUTATIONAL LOAD FOR PROCESSING AUDIO DATA

TECHNOLOGICAL FIELD

Embodiments of the present invention relate generally to three dimensional (3D) audio rendering and, more particularly, relate to a method, apparatus and computer program product which enables more efficient browsing and selection of media items for 3D audio rendering as well as reducing the high computational load associated with processing 3D audio data.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. Due to the now ubiquitous nature of electronic communication devices, people of all ages and education levels are utilizing electronic devices to communicate with other individuals or contacts, receive services and/or share information, media and other content. One area in which there is a demand to increase ease of convenience to users relates to 3D audio rendering for media players on electronic communication devices (e.g., mobile phones). At present, many users utilize electronic communication devices to play audio data such as music (e.g., albums) that may be contained in music libraries, audio associated with movies, video clips or the like. The audio data may be coded to achieve 3D audio (e.g., spatial audio) effects. However, the audio data may be in any format such as for example multi channel, stereo, monophonic, etc.

Since many users utilize electronic communication devices to play media content, it may be desirable to provide a mechanism for a communication device to facilitate efficient browsing of a collection of media data (e.g., musical items such as songs) and selection of a media item (e.g., a song from a music library (e.g., album) from the collection. For instance, the increasing memory resources of communication devices have enabled users to store a wide selection of media content consisting of for example thousands of music items. As such, selecting and finding a desired media item is becoming more difficult since a user typically needs to browse through long lists of media items (e.g., musical libraries, movie libraries, etc.).

FIG. 1 presents an example of a tree structure of a media collection in which a user of a communication device may navigate to find desired media content. As shown in FIG. 1, typically, the media content is indexed based on the name of an album, movie, image, etc. or the media items may be categorized for example by the author, composer, performer or band name. In addition, representative pictures such as album covers (e.g., album covers 1, 2 & 3 of FIG. 2) or movie posters may be viewed by the user on a display of a communication device. As such, the conventional mechanism for browsing the media content on a communication device is based on an indexed list of media items, music albums, authors, composers, genre, etc. However, relying only on visual feedback regarding the selection of media content may not necessarily be the most efficient mechanism of selection. For instance, the user may not be able to concentrate on reading the names of the images for selection while for example walking on a street or driving a car, which may inhibit the user's ability to select media content associated with the images.

Alternatively, as shown in FIG. 2, the browsing of media content may be performed via a graphical user interface, of a communication device, having 3D rendered images of album covers (e.g., album covers 1, 2 & 3), movie posters, etc. The user may see a plurality of items simultaneous on a display of the communication device and may scroll the possible selections for example with a pointing device on a keypad or by sliding a finger or stylus on a touch screen of the display. FIG. 2 also presents an example in which the album covers may be flipped on the display. In this example, the selection of the album covers on the display may be changed by sliding a finger on a touch screen.

The conventional manner in which to select the media data (e.g., album covers 1, 2 & 3) in the example of FIG. 2 is typically by double clicking on one of the album covers (e.g., album cover 1). In response to selecting the desired media content (e.g., an image of album cover 1), the graphical user interface may then play audio (e.g., a song) associated with the selected media data. However, browsing through collections of media items and selecting an item so that audio associated with the selected item is played may not be the most efficient mechanism of browsing a collection of media items (e.g., music library) and selecting a media item for playing the associated audio, especially when the collection of media items is large. For instance, this conventional mechanism of browsing may take a user a long time to get through the playlist and requires visual feedback regarding the selection of the media item.

In view of the foregoing drawbacks, it may be desirable to provide a mechanism that more efficiently facilitates browsing and selection of media items for 3D audio rendering as well as to reduce the high computational load associated with audio coding of 3D audio data.

BRIEF SUMMARY

A method, apparatus and computer program product are therefore provided that enable the provision of a computationally efficient technique for processing of multi-channel audio applicable to browsing and selecting of audio items. In this regard, the exemplary embodiments provide an efficient mechanism in which to browse and select desired media items (e.g., images, video data, video clips, audio data, etc.) that may be grouped (e.g., a music library, movie library, etc.) and stored in a database or memory of an apparatus (e.g., mobile device).

For instance, the exemplary embodiments may provide an apparatus including a 3D audiovisual device (also referred to herein as a 3D audiovisual renderer) that may enable a user of the apparatus to browse the media items without requiring the user to have to look at a display of the apparatus to select a desired media item (e.g., an image associated with audio data). Instead, the user may browse the media items based on listening to the audio associated with the media items on the display. Moreover, it should be pointed out that the user may utilize a combination of looking at the media items on the display and listening to audio associated with the media items shown on the display when browsing the media items in some instances.

However, since the audio data associated with each of the media items shown on the display may be played simultaneously, the user of the apparatus may browse the media items faster based on the audio as opposed to looking at the media items on the display and selecting a media item in order to play the audio associated with the selected media item. Additionally, it should also be pointed out that the exemplary embodiments may generate one or more directional audio signals corresponding to the direction(s), location(s) or position(s) of the media items shown on the display. Furthermore, the exemplary embodiments may generate one or more directional audio signals corresponding to the direction(s), location(s) or position(s) of the items of media data outside (or not shown on) the display. In this regard, when new items are brought onto the display the audio associated with the new media items may be faded in by the 3D audiovisual device and when an old media item(s) is removed from the display the audio data associated with the old media item may be faded out by the audiovisual device.

Additionally, the exemplary embodiments provide an efficient manner to process 3D audio data (e.g., spatial audio) which may reduce the computational load associated with rendering audio data. In this regard, the exemplary embodiments may retrieve audio signals/data (e.g., 3D audio data/signals) associated with the media items (e.g., images, video data, etc.) shown on a display. In response to determining that the retrieved audio signals/data relate to multi channel audio signals/data, the exemplary embodiments may downmix the multi-channel audio data signals to monophonic audio signals/data which may be more efficient to process during 3D rendering of the audio thereby lowering a computational load. Moreover, during 3D rendering of the retrieved audio, the exemplary embodiments may receive information regarding the directions, locations and positions of the media items on the display or outside the display and utilize this information to generate one or more corresponding directional audio signals in which the associated audio may be rendered in the direction(s), location(s) or position(s) of the media items currently on the display or outside the display. Additionally, the exemplary embodiments may utilize one or more 3D parameterizations during the process of rendering 3D audio. The 3D parameterizations may include, but are not limited to, one or more HRTF parameterizations, BCC parameterizations (e.g., modified BCC parameterizations) or parameterizations associated with stereo widening algorithms. The 3D parameterizations may be used to upmix audio signals (e.g., monophonic signals) during the process of rendering 3D audio.

Furthermore, the exemplary embodiments facilitate a smooth transition from the 3D rendered audio data to the corresponding original audio data in response to a user selecting a media item shown on a display of the apparatus of the exemplary embodiments. In this regard, the original audio signal(s)/data that were retrieved by the exemplary embodiments may be restored by interpolating one or more coefficients, associated with the 3D parameterizations, during a predetermined time window (e.g., 500 ms) from the user's selection of the media item.

In one exemplary embodiment, a method for facilitating efficient browsing and selection of media content and reducing the computational load of processing audio data is provided. The method may include obtaining audio signals corresponding to items of media data. The audio data associated with each of the audio signals may be played simultaneously.

The method may also include determining whether the audio signals correspond to multi channel audio signals in order to determine whether to generate simplified audio signals. The method may also include determining one or more directions or locations to output the audio data associated with each of audio signals. The determined directions or locations correspond to one or more directions that respective items of the media data are currently being moved or one or more locations of the respective items of media data.

In another exemplary embodiment, an apparatus for facilitating efficient browsing and selection of media content and reducing the computational load of processing audio data is provided. The apparatus may include a processor and a memory including computer program code. The memory and the computer program code are configured to, with the processor, cause the apparatus to at least perform operations including obtaining audio signals corresponding to items of media data. The audio data associated with each of the audio signals may be played simultaneously. The computer program code may also determine whether the audio signals correspond to multi channel audio signals in order to determine whether to generate simplified audio signals and determine one or more directions or locations to output the audio data associated with each of audio signals. The determined directions or locations correspond to one or more directions that respective items of the media data are currently being moved or one or more locations of the respective items of media data.

In another exemplary embodiment, a computer program product for facilitating efficient browsing and selection of media content and reducing the computational load of processing audio data is provided. The computer program product includes at least one computer-readable storage medium having computer-executable program code instructions stored therein. The computer-executable program code instructions may include program code instructions for obtaining audio signals corresponding to items of media data currently shown on a display. The audio data associated with each of the audio signals may be played simultaneously. The computer-executable program instructions may also determine whether the audio signals correspond to multi channel audio signals in order to determine whether to generate simplified audio signals and determine one or more directions or locations to output the audio data associated with each of audio signals. The determined directions or locations correspond to one or more directions that respective items of the media data are currently being moved or one or more locations of the respective items of media data.

In the exemplary method, computer program product and apparatus described above, the items of media data may be currently shown on a display or the items of media data may be located outside the display, which may not be currently shown on the display.

Embodiments of the invention may provide a method, apparatus, and computer program product for providing a computationally efficient technique for processing of multi-channel audio data applicable to browsing and selecting media items associated with the audio data. As a result, mobile terminal users may enjoy improved capabilities for browsing and selecting desired media items.

BRIEF DESCRIPTION OF THE SEVERAL VIEWS OF THE DRAWINGS

Figure 1:
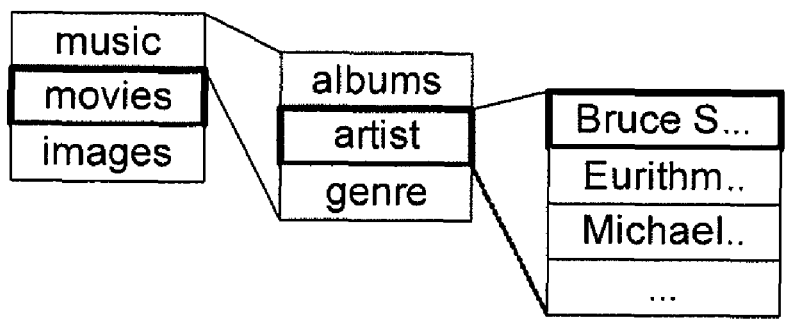
Figure 2:
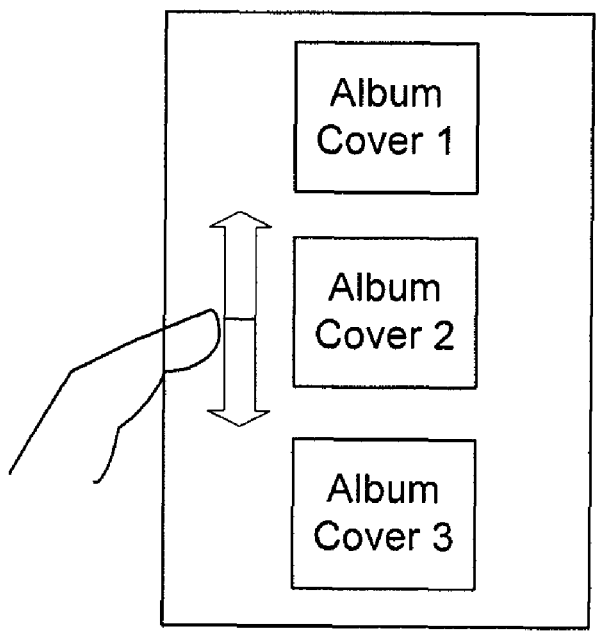
Figure 3:
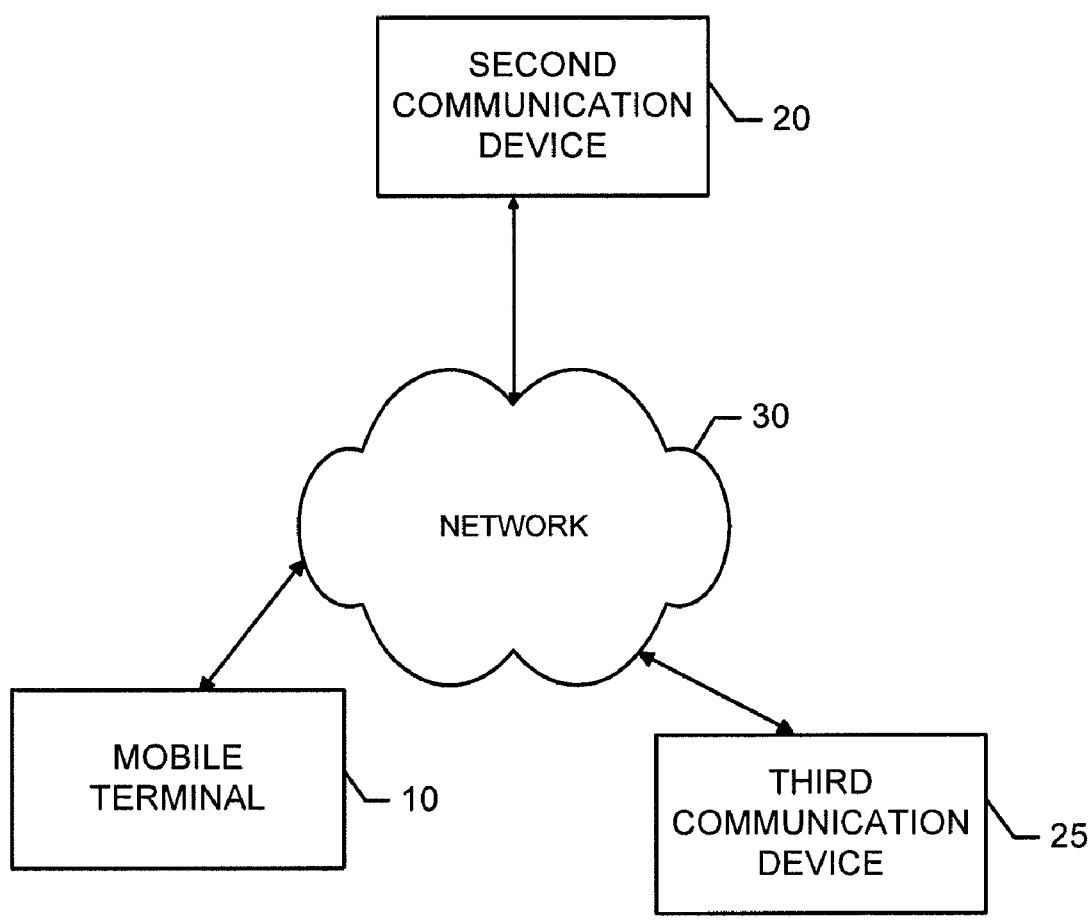
Figure 4:
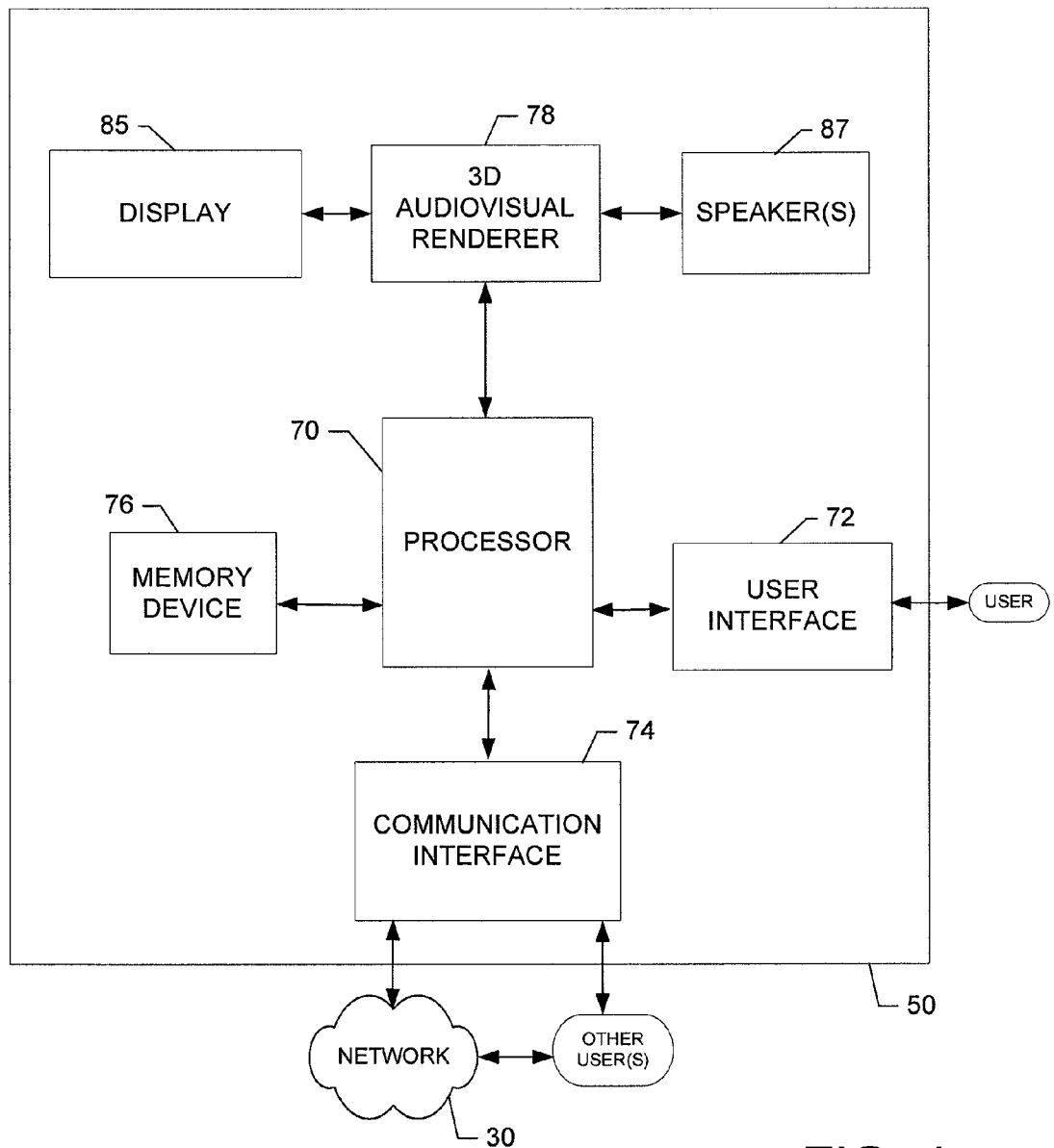
Figure 5:
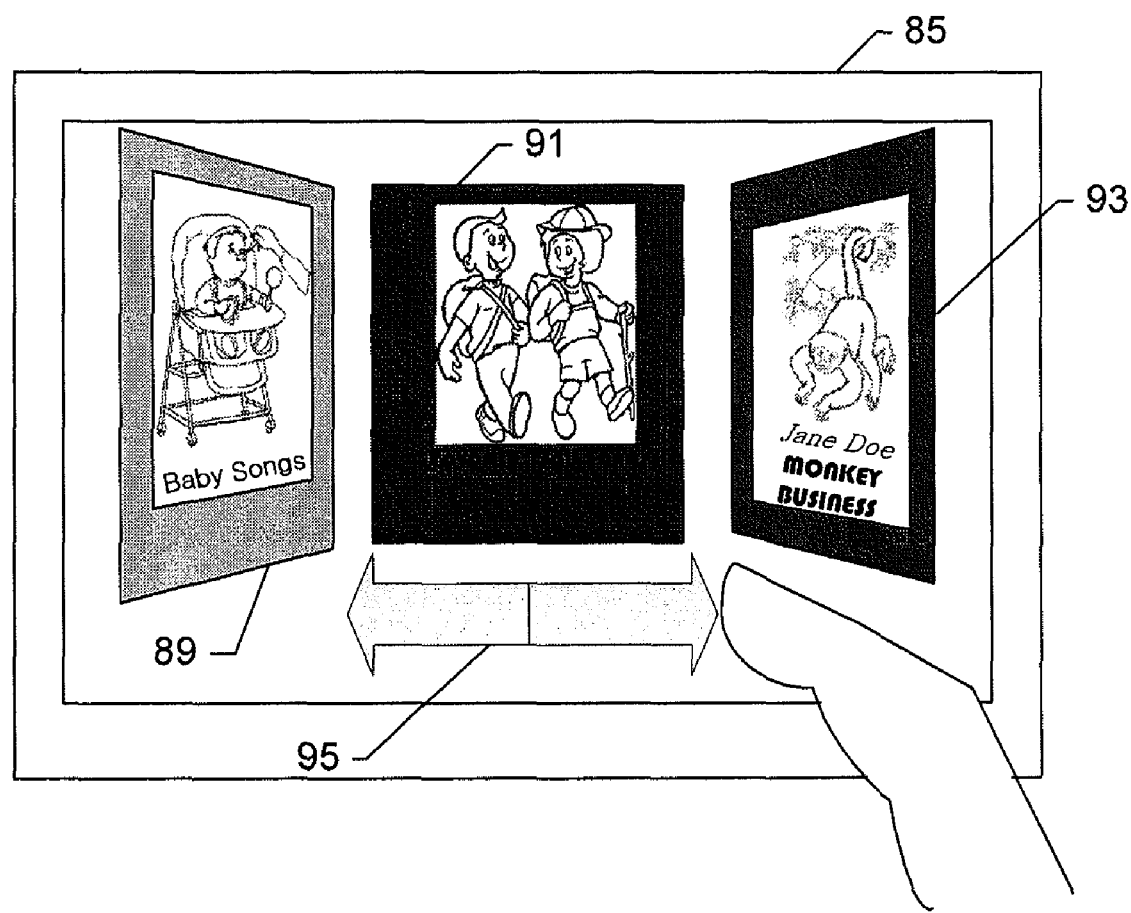
Figure 6:
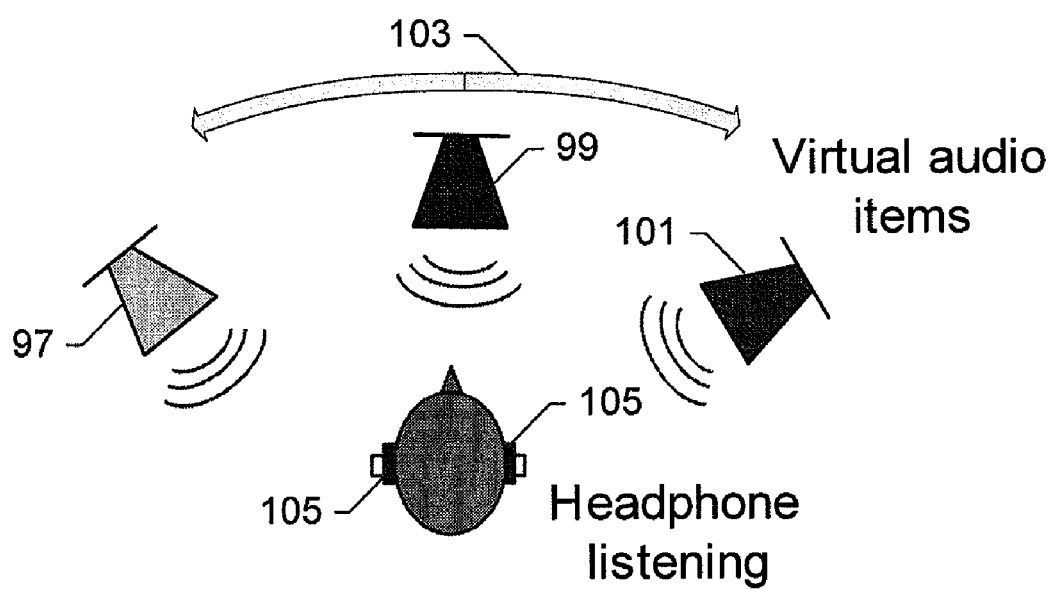
Figure 7:
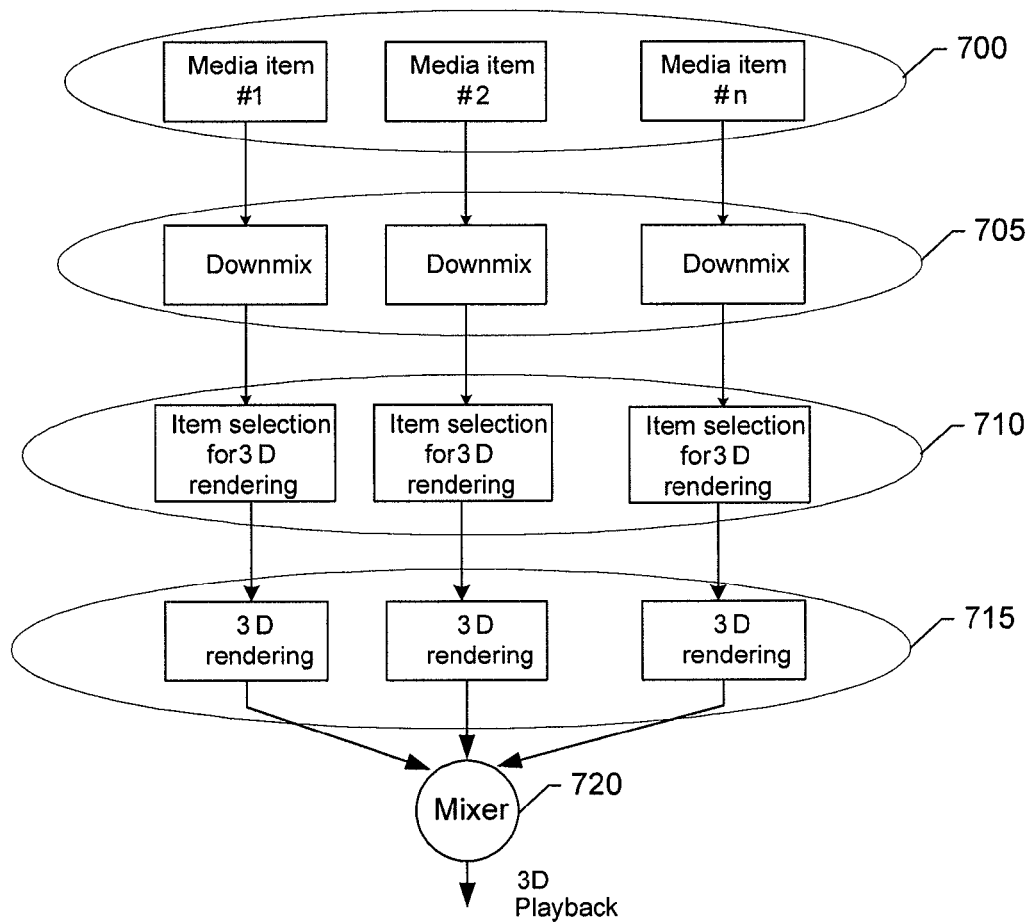

Having thus described the invention in general terms, reference will now be made to the accompanying drawings, which are not necessarily drawn to scale, and wherein:

FIG. 1 is diagram of a tree structured selection of media available for a media player;

FIG. 2. is a diagram of a 3D rendered music selection for browsing through album covers;

FIG. 3 is a schematic block diagram of a system according to an exemplary embodiment of the invention;

FIG. 4 is a schematic block diagram of an apparatus for facilitating efficient browsing and selection of media content and reducing the computational load of processing audio data according to an exemplary embodiment of the invention;

FIG. 5 is a diagram of a display of an apparatus for facilitating efficient browsing and selection of media content according to an exemplary embodiment of the invention;

FIG. 6 is a diagram of 3D rendered audio data as virtual audio sources or items according to an exemplary embodiment; and FIG. 7 is a flowchart according to an exemplary method for facilitating efficient browsing and selection of media content and reducing the computational load of processing audio data according to an exemplary embodiment of the invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

The exemplary embodiments relate, in part, to 3D audio rendering of audio data for interaction via a 3D audiovisual renderer. Additionally, the exemplary embodiments relate in part to improved techniques for performing audio coding. The improved techniques of the exemplary embodiments may reduce the high computational load on communication devices associated with conventional audio coding techniques. Some of the conventional audio coding techniques are described below.

Recently, developed parametric audio coding methods such as binaural cue coding (BCC) may enable multi-channel and surround (e.g., spatial) audio coding and representation. The parametric methods for coding of spatial audio are typically associated with parameters describing the differences between channels of the original signal in order to enable reconstruction of a signal having a spatial image similar to that of the original signal. These parameters are often referred to as spatial cues or spatial parameters. This kind of coding scheme facilitates compression of multi-channel signals with high audio quality.

The parameters associated with the binaural cue coding approach may comprise parameters descriptive of inter-channel level difference, inter-channel time difference and inter-channel coherence between one or more channel pairs and/or in one or more frequency bands. Furthermore, alternative parameters such as direction of arrival may be used in addition to or instead of the inter-channel parameters discussed above. Given that the extracted spatial information is typically adequate, the extracted information may enable the encoded signal to be decoded into any other spatial mixing format, for a loudspeaker system, for example. In this regard, for example, a multi-channel movie soundtrack mixed or recorded originally for a 5.1 Dolby Digital™ loudspeaker system, may be upmixed for a more modern 7.2 Dolby Digital™ loudspeaker system.

It should also be pointed out that spatial audio (e.g., 3D audio) may be considered with respect to head-related transfer functions (HRTFs) in addition to the viewpoint of binaural technology (e.g., BCC technology). The corresponding head-related impulse response (HRIR) of a HRTF may effectively represent the impulse response from a sound source in a 3D audio space to one of the ears of a listener. The impulse response from the sound source to the near ear (e.g., the ear on the same side of the head as the source) is called the ipsi-lateral HRIR and the impulse response from the sound source to the far ear (e.g., the ear on the opposite side of the head as the source) is called the contra-lateral HRIR. Furthermore, the sound that arrives at the far ear is slightly delayed relative to the sound at the near ear, and this delay is referred to as the Interaural Time Difference (ITD). In practice, the temporal duration of an HRTF is of the order of 1 ms, and the ITD is typically smaller than 1 millisecond (ms).

When applying an HRTF/HRIR approach to achieve 3D audio effects, a single virtual source may be conventionally implemented by using two digital filters, for example finite impulse response (FIR) filters, representing the ipsi-lateral and contra-lateral HRTFs together with a suitable delay applied to the contra-lateral signal path in order to represent the ITD. A pair of HRTF filters typically represents the signal path from a specific point of 3D auditory space to the ears of a user/listener. The HRTFs are typically user-specific and in this regard a dedicated set of HRTFs are needed for each user/listener in order to achieve an optimal spatial audio experience. It should be pointed out however that in many applications a set of general HRTFs may be used to provide an approximation for HRTFs applicable to a particular set of users/listeners.

The processing associated with conventional parametric coding techniques and HRTF approaches to achieve 3D audio effects typically result in relatively high computational load on communication devices. Moreover, the computational load is increased when multiple simultaneous sound sources are rendering audio on the communication device. High communication load may have drawbacks related to a decrease in the processing speed of the communication device and may decrease the bandwidth of resources within the communication device. As such, the exemplary embodiments provide a mechanism for more efficiently processing audio data/signals that may be rendered by a communication device. More particularly, the exemplary embodiments provide a mechanism for reducing the computational load of a communication device when multiple simultaneous audio sources are rendering audio data on the communication device.

FIG. 3 illustrates a generic system diagram in which a device such as a mobile terminal 10 is shown in an exemplary communication environment. As shown in FIG. 3, an embodiment of a system in accordance with an example embodiment of the invention may include a first communication device (e.g., mobile terminal 10) and a second communication device 20 capable of communication with each other via a network 30. In some cases, embodiments of the present invention may further include one or more additional communication devices, one of which is depicted in FIG. 3 as a third communication device 25. In some embodiments, not all systems that employ embodiments of the present invention may comprise all the devices illustrated and/or described herein. While several embodiments of the mobile terminal 10 and/or second and third communication devices 20 and 25 may be illustrated and hereinafter described for purposes of example, other types of terminals, such as portable digital assistants (PDAs), pagers, mobile televisions, mobile telephones, gaming devices, laptop computers, cameras, video recorders, audio/video players, radios, global positioning system (GPS) devices, Bluetooth headsets, Universal Serial Bus (USB) devices or any combination of the aforementioned, and other types of voice and text communications systems, can readily employ embodiments of the present invention. Furthermore, devices that are not mobile, such as servers and personal computers may also readily employ embodiments of the present invention.

The network 30 may include a collection of various different nodes (of which the second and third communication devices 20 and 25 may be examples), devices or functions that may be in communication with each other via corresponding wired and/or wireless interfaces. As such, the illustration of FIG. 3 should be understood to be an example of a broad view of certain elements of the system and not an all inclusive or detailed view of the system or the network 30. Although not necessary, in some embodiments, the network 30 may be capable of supporting communication in accordance with any one or more of a number of First-Generation (1G), Second-Generation (2G), 2.5G, Third-Generation (3G), 3.5G, 3.9G, Fourth-Generation (4G) mobile communication protocols, Long Term Evolution (LTE), and/or the like. In some embodiments, the network 30 may be a point-to-point (P2P) network.

One or more communication terminals such as the mobile terminal 10 and the second and third communication devices 20 and 25 may be in communication with each other via the network 30 and each may include an antenna or antennas for transmitting signals to and for receiving signals from a base site, which could be, for example a base station that is a part of one or more cellular or mobile networks or an access point that may be coupled to a data network, such as a Local Area Network (LAN), a Metropolitan Area Network (MAN), and/or a Wide Area Network (WAN), such as the Internet. In turn, other devices such as processing elements (e.g., personal computers, server computers or the like) may be coupled to the mobile terminal 10 and the second and third communication devices 20 and 25 via the network 30. By directly or indirectly connecting the mobile terminal 10 and the second and third communication devices 20 and 25 (and/or other devices) to the network 30, the mobile terminal 10 and the second and third communication devices 20 and 25 may be enabled to communicate with the other devices or each other, for example, according to numerous communication protocols including Hypertext Transfer Protocol (HTTP) and/or the like, to thereby carry out various communication or other functions of the mobile terminal 10 and the second and third communication devices 20 and 25, respectively.

Furthermore, although not shown in FIG. 3, the mobile terminal 10 and the second and third communication devices 20 and 25 may communicate in accordance with, for example, radio frequency (RF), near field communication (NFC), Bluetooth (BT), Infrared (IR) or any of a number of different wireline or wireless communication techniques, including Local Area Network (LAN), Wireless LAN (WLAN), Worldwide Interoperability for Microwave Access (WiMAX), Wireless Fidelity (WiFi), Ultra-Wide Band (UWB), Wibree techniques and/or the like. As such, the mobile terminal 10 and the second and third communication devices 20 and 25 may be enabled to communicate with the network 30 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like.

In example embodiments, the first communication device (e.g., the mobile terminal 10) may be a mobile communication device such as, for example, a wireless telephone or other devices such as a personal digital assistant (PDA), mobile computing device, camera, video recorder, audio/video player, positioning device, game device, television device, radio device, or various other like devices or combinations thereof The second communication device 20 and the third communication device 25 may be mobile or fixed communication devices. However, in one example, the second communication device 20 and the third communication device 25 may be servers, remote computers or terminals such as personal computers (PCs) or laptop computers.

In an exemplary embodiment, the network 30 may be an ad hoc or distributed network arranged to be a smart space. Thus, devices may enter and/or leave the network 30 and the devices of the network 30 may be capable of adjusting operations based on the entrance and/or exit of other devices to account for the addition or subtraction of respective devices or nodes and their corresponding capabilities. In an exemplary embodiment, one or more of the devices in communication with the network 30 may employ a 3D audiovisual renderer. The 3D audiovisual renderer may provide efficient browsing and selection of media items for 3D audio rendering and may reduce the high computational load associated with audio coding of 3D audio data via a communication device (e.g., mobile terminal 10).

In an exemplary embodiment, the mobile terminal 10 and the second and third communication devices 20 and 25 may be configured to include the 3D audiovisual renderer. However, in other alternative embodiments the mobile terminal 10 may include the 3D audiovisual renderer and the second and third communication devices 20 and 25 may be network entities such as servers or the like that are configured to communicate with the mobile terminal 10.

In an exemplary embodiment, the mobile terminal as well as the second and third communication devices 20 and 25 may employ an apparatus (e.g., apparatus of FIG. 4) capable of employing embodiments of the invention.

FIG. 4 illustrates a schematic block diagram of an apparatus for facilitating efficient browsing and selection of media items and minimizing computational load associated with 3D audio rendering according to an exemplary embodiment of the invention. An exemplary embodiment of the invention will now be described with reference to FIG. 4, in which certain elements of an apparatus 50 are displayed. The apparatus 50 of FIG. 4 may be employed, for example, on the mobile terminal 10 (and/or the second communication device 20 or the third communication device 25). Alternatively, the apparatus 50 may be embodied on a network device of the network 30. However, the apparatus 50 may alternatively be embodied at a variety of other devices, both mobile and fixed (such as, for example, any of the devices listed above). In some cases, embodiments may be employed on a combination of devices. Accordingly, some embodiments of the present invention may be embodied wholly at a single device (e.g., the mobile terminal 10), by a plurality of devices in a distributed fashion (e.g., on one or a plurality of devices in a P2P network) or by devices in a client/server relationship. Furthermore, it should be noted that the devices or elements described below may not be mandatory and thus some may be omitted in certain embodiments.

Referring now to FIG. 4, an apparatus 50 for facilitating efficient browsing and selection of media items and minimizing computational load associated with 3D audio rendering is provided. The apparatus 50 may include or otherwise be in communication with a processor 70, a user interface 72, a communication interface 74, a memory device 76, a display 85, a 3D renderer 85 and one or more speakers 87. The memory device 76 may include, for example, volatile and/or non-volatile memory. The memory device 76 may be configured to store information, data, applications, instructions or the like for enabling the apparatus to carry out various functions in accordance with exemplary embodiments of the invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content (e.g., images, pictures, video clips (e.g., movies), audio data (e.g., music, songs, ring tones, etc.). The memory device 76 may store the media content in one or more media collections, libraries, galleries or the like (e.g., music and/or movie libraries, etc.).

The processor 70 may be embodied in a number of different ways. For example, the processor 70 may be embodied as various processing means such as a processing element, a coprocessor, a controller or various other processing devices including integrated circuits such as, for example, an ASIC (application specific integrated circuit), an FPGA (field programmable gate array), a hardware accelerator, or the like. In an exemplary embodiment, the processor 70 may be configured to execute instructions stored in the memory device 76 or otherwise accessible to the processor 70. As such, whether configured by hardware or software methods, or by a combination thereof, the processor 70 may represent an entity (e.g., physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70, which may otherwise be a general purpose processing element or other functionally configurable circuitry if not for the specific configuration provided by the instructions, to perform the algorithms and operations described herein. However, in some cases, the processor 70 may be a processor of a specific device (e.g., a mobile terminal) adapted for employing embodiments of the invention by further configuration of the processor 70 by instructions for performing the algorithms and operations described herein. The processor 70 may be configured to operate a connectivity program, such as a conventional Web browser. The connectivity program may then enable the apparatus 50 to transmit and receive Web content, such as location-based content, according to a Wireless Application Protocol (WAP), for example. The processor 70 may also be in communication with a display 85 and may instruct the display to illustrate any suitable information, data, content (e.g., media content) or the like.

Meanwhile, the communication interface 74 may be any means such as a device or circuitry embodied in either hardware, software, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (e.g., network 30). In fixed environments, the communication interface 74 may alternatively or also support wired communication. The communication interface 74 may receive and/or transmit data via one or more communication channels. Additionally in some embodiments the communication interface 74 may include a communication modem and/or hardware/software for supporting communication via cable, digital subscriber line (DSL), universal serial bus (USB), Ethernet or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, pointing device (e.g., stylus, pen, etc.) a joystick, a display, a touch screen, an accelerometer, a gyro, a force sensor, a magnetometer, a microphone, a speaker, or other input/output mechanisms. In an exemplary embodiment in which the apparatus is embodied as a server or some other network devices, the user interface 72 may be limited, remotely located, or eliminated.

It should be pointed out that the processor 70 may comprise user interface circuitry configured to control at least some functions of one or more elements of the user interface. The processor and/or user interface circuitry of the processor may be configured to control one or more functions of one or more elements of the user interface through computer program instructions (e.g., software and/or firmware) stored on a memory accessible to the processor (e.g., volatile memory, non-volatile memory, and/or the like).

In an exemplary embodiment, the processor 70 may be embodied as, include or otherwise control a 3D audiovisual renderer 78. The 3D audiovisual renderer 78 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the 3D audiovisual renderer 78 as described below. Thus, in examples in which software is employed, a device or circuitry (e.g., the processor 70 in one example) executing the software forms the structure associated with such means.

In this regard, for example, the 3D audiovisual renderer 78 may be configured to perform, among other things, 3D audio rendering functions with respect to 3D (e.g., spatial) audio data on the apparatus 50. The 3D audiovisual renderer 78 may be in communication with display 85. In an exemplary embodiment, the display 85 may, but need not be, a touch screen display that may detect the location and presence of a contact or touch within an area of the display 85. The touch or contact may be provided by stylus, pen or the like or a finger of a hand. However, it should be pointed out that the touch screen display may not be the only modality to browse and select the media content. In this regard, a user interface (e.g., user interface 72) including a keyboard (e.g., keypad) and/or mouse or any sensor configuration detecting for example motion, tilt, acceleration, force, etc., may be utilized.

The 3D audiovisual renderer 78 may also be in communication with one or more speakers 87 (e.g., one or more headphones, earphones, loudspeaker(s), loudspeaker systems, etc.) and the 3D audiovisual renderer 78 may instruct the speakers 87 to generate and output audio data (e.g., sound). In the exemplary embodiments, the 3D audiovisual renderer 78 may provide an efficient manner in which to browse and select media items that may be graphically shown by display 85 and the 3D audiovisual renderer 78 may reduce the computational load associated with 3D audio rendering. It should be pointed out that the media items may, but need not, be grouped such as for example in one or more collections, libraries (e.g., music libraries), galleries (e.g., movie galleries) or the like.

The 3D audiovisual renderer 78 may allow a user to utilize a pointing device, finger or the like to browse and select media content available on an internal memory (e.g., memory device 76) or external memory (not shown) of the apparatus 50 as well as a remote memory stored in a network entity (e.g., third communication device 25) such as for example a server provided by a network. For example, when a user is browsing the available media content (e.g., a music library) of the apparatus 50 or a remote memory provided by a network entity, the 3D audiovisual renderer 78 may generate a corresponding 3D graphical representation of the media item (e.g., image of an album cover, image of a movie poster, etc.) that may be rendered on the display 85. While the images representing the media content may be music album covers, movie posters, etc., the images may be representative of any visual cue of a media item(s).

As an example of the mechanism of browsing and selecting media items according the exemplary embodiments consider FIG. 5. As shown in FIG. 5, the media content such as for example media content 89, 91 and 93 may, but need not, be images that are stored in an internal memory or external memory of the apparatus 50 or a remote memory of a network entity (e.g., third communication device 25). In this example, the images corresponding to the media content (e.g., media content 89, 91 and 93) may be images of respective album covers, however the images may relate to any other suitable visual representation(s) (e.g., movie posters). The images related to the media content may be associated with audio data such as for example one or more songs corresponding to an artist(s) related to the album covers or any other suitable audio data (e.g., audio data associated with a movie, video clip or the like). The media content may, but need not, be part of a group such as for example a collection, library, gallery, etc. For instance, in the example of FIG. 5, the media content may be part of a music library comprising a plurality of songs.

A user of the apparatus 50 may utilize the scroll bar 95 to browse media content. In this regard, the user may browse the media content by moving the 3D rendered images (e.g., media content 89, 91 and 93), via the scroll bar 95, from left to right or right to left for example by sliding a finger on the touch screen of the display 85 or pressing arrow keys on a keyboard or keypad of the user interface 72 or any sensor information (e.g., motion, acceleration) regarding the gestures the user is performing. It should be pointed out that instead of utilizing the "card deck" layout of FIG. 5, the images corresponding to the media content may also be rendered within a 3D space such as for example a map overlay. In this regard, the user may navigate the media content in the given 3D space using a pointing device, mouse, keyboard, touch screen, motion sensor, etc.

Generating Spatial Multimedia Via the 3D Audiovisual Renderer

The selection and browsing of the media content may be enhanced and made more intuitive by the 3D audiovisual renderer 78 by adding or associating a 3D or stereo audio component to the 3D rendering of the images representing the media content (e.g., media content 89, 91 and 93). For this purpose, each media item of the media content such as, for example, an image of a music album or a movie may have a representative audio segment or audio data associated with it as described above. For media items (e.g., pictures, photos, etc.) that do not originally have associated audio data, the 3D audiovisual renderer 78 may use one or more random audio segments from the media content stored in a memory (e.g., memory device 76) of the apparatus 50 or a remote memory in a network entity and the 3D audiovisual renderer 78 may associate the audio data of the random audio segment with the media items. For instance, a representative audio segment or clip of a music album may be available in a remote server hosted for example by a record label company together with the album cover images. The 3D audiovisual renderer 78 may fetch the audio segment or clip together with the image.

In this regard, the representative audio data or audio segments associated with the media items or media content (e.g., media content 89, 91 and 93) may be rendered by the 3D audiovisual renderer 78 in 3D space in the same direction, position, or location of the graphical representation of the particular media item or media content. For purposes of illustration and not of limitation consider FIG. 5, as an example regarding the manner in which the 3D audiovisual renderer 78 may render audio data associated with media content in 3D space in the same direction or location as graphical representations of corresponding media content. The audio data or audio signals referred to herein may include, but is not limited to, multi channel audio data/signals, stereo audio data/signals, monophonic audio data/signals, spatial audio data/signals and the like.

Referring again to FIG. 5, as described above, the display 85 may show media content 89, 91 and 93 associated with images of respective album covers. For purposes of illustration and not of limitation, the display 85 of FIG. 5 may show three items of media content at any given time. However, it should be pointed out that the display 85 may show any suitable number of items of media content at any given time without departing from the spirit and scope of the invention.

While the media content 89, 91 and 93 is shown on the display 85, the 3D audiovisual renderer 78 may instruct one or more speakers 87 to simultaneously play the audio data such as for example a song(s) associated with each of the images of the album covers of the media content 89, 91 and 93. In this regard, audio associated with three songs may be playing simultaneously in the example of FIG. 5. When a user of the apparatus 50 utilizes a finger or pointing device (e.g., stylus) or the like to browse the media content in a left to right direction, for example, the audio data associated with the graphical representation of the media content (e.g., an image of another album cover associated with audio data (e.g., songs)) that is brought onto the display 85 from the left may be faded, by the 3D audiovisual renderer 78, into the audio being played simultaneously.

Additionally, the audio data associated with the graphical representation of the media content 93 (e.g., an image associated with an album cover) may be removed from the display 85 based on the user browsing or scrolling in a left to right direction. As the media content 93 is being removed from the display 85, the 3D audiovisual renderer 78 may fade the audio data (e.g., a song) associated with media content 93 out of the audio being played simultaneously. Since the user of the apparatus 50 may be utilizing the scroll bar 95 (or a finger, pointing device, etc.) to move the media content from the left to right, media content 91 may appear in a right portion of the display 85. Additionally, the audio data associated with media content 91 may continue to play simultaneously with the audio data associated with media content 89 (which may now appear in a middle portion of display 85) and audio data associated with the media content (e.g., an image associated with another album cover) (not shown) that was brought onto the display 85 (which may now appear in a left portion of the display 85).

In this regard, the audio data (e.g., a song) associated with the graphical representations of media content shown on display 85 may be rendered in 3D space in the same direction or location as the corresponding graphical representation of particular media content (e.g., media content 89). It should be pointed out that in the exemplary embodiment of FIG. 5, the 3D audiovisual renderer 78 may start the playback of a first piece of audio data such as a first song of a given album or sound track associated with media content when the media content is graphically represented on the display 85.

Since the apparatus 50 may play audio data simultaneously that is associated with graphical representations of media content in the direction/location/position shown on display 85, a user may be able to browse collections of media content faster and more efficiently by listening to the corresponding audio data. For instance, since the apparatus 50 may play audio data simultaneously in the direction/location/position of graphical representations shown on the display 85, a user of apparatus 50 may use the audio data being played to browse a collection and may select media content based in part on the audio data as opposed to making a selection based on visible indicia as in conventional approaches. For example, as described above with respect to FIG. 2, in conventional approaches of browsing media content, a user typically relies on visible feedback such as a name (e.g., name of an album cover) or other visible indicators identifying the media content in order to select the media content so that the corresponding audio may be played. But relying on visible indicia alone to select the media content in order to play the associated audio may not be the most efficient mechanism, particularly when the user's vision is inhibited (e.g., user is walking, driving a car, etc.)

Referring now to FIG. 6, an exemplary embodiment relating to the rendering of virtual audio sources corresponding to the graphical representations of the media content in FIG. 5 is provided. In the exemplary embodiment of FIG. 6, the user of the apparatus 50 may be utilizing speakers such as for example headphones 105 (also referred to herein as earphones 105) to listen to audio data (e.g., 3D audio data). However, in alternative exemplary embodiments, one or more speakers such as a loudspeaker(s) or a loudspeaker system or the like may be utilized to play the audio data associated with media content.

It should be pointed out that by utilizing headphones, audio data or sounds presented via the headphones may appear to originate from any desired directions in space and a perception of one or more virtual audio/sound sources outside the user/listener's head may be created. In this regard, the headphones 105 allow audio data to play simultaneously in different directions and as such a user of apparatus 50 may more easily listen and distinguish the audio corresponding to audio data items (e.g., songs, audio corresponding to a movie, video clip or the like) that are played simultaneously. Also, when headphones or earphones 105 are utilized by a user/listener of apparatus 50, the audio associated with media content (e.g., media content 89, 91 and 93) may, but need not, correspond to monophonic signals and in this regard when the signals are rendered by the 3D audiovisual renderer 78 a monophonic signal corresponding to each item of media content may be sent to the user's/listener's right ear and left ear via the headphones 105 and in this regard the headphones may generate the perception that the monophonic signals are coming from several different directions which may provide a 3D audio effect.

Due to the nature of 3D audio perception, a user may easily distinguish simultaneously played audio data since the audio data may be provided in different directions. For instance, the media content on the left and right (e.g., media content 89 and 93) of the display 85 are at different directions which may be farther away from a user than a direction of the media content in the middle (e.g., media content 91) of the display 85. Additionally, in an alternative exemplary embodiment, the 3D audiovisual renderer 78 may apply a reverb to the items of media content on the left and right of the display 85 to provide the perception that the audio data associated with the media content on the right and left of the display are at an even farther distance away from the user. In this regard, sound associated with the media content in the middle of the display 85 may appear louder to the user than the sound associated with the media content positioned on the left and right of the display 85. In another alternative exemplary embodiment, the 3D audiovisual renderer 78 may increase a sound level associated with media content positioned in the middle of the display 85 such that the sound associated with the audio data of the media content in the middle of the display 85 may be more distinguishable from the sound associated with the audio data corresponding to the media content positioned on the right and left of the display 85.

In the exemplary embodiment of FIG. 6, the audio data originating from different directions may be shown by the virtual audio sources 97, 99 and 101 of FIG. 6, which may be graphical representations of the different directions of audio corresponding to media content (e.g., audio data associated with media content 89, 91 and 93). In this regard, it should be pointed out that the virtual audio source 97 may correspond to media content 89, virtual audio source 99 may correspond to media content 91 and virtual audio source 99 may correspond to media content 93. Additionally, in the exemplary embodiment of FIG. 6, the 3D audiovisual renderer 78 may move the virtual audio sources 97, 99, 101 synchronously with the graphical items corresponding to media content 89, 91 and 93. In this regard, when the media content (e.g., images of album covers) is moved by a certain angle, position or direction by a user, the 3D audiovisual renderer 78 may move the corresponding virtual audio sources 97, 99, 101 accordingly, even if the media content is not yet shown on the display 85.

As described above, when a new item of media content appears on the display 85, the 3D audiovisual renderer 78 may start the play of the associated audio data in the corresponding direction or location of the media content on the display 85. Similarly, the audio rendering of an item of media content disappearing from the display 85 may be stopped by the 3D audiovisual renderer 78.

In an exemplary embodiment, when headphones 105 are utilized by a user of the apparatus 50, the audio items associated with the media content may be rendered by the 3D audiovisual renderer 78 by using for example head related transfer function (HRTF) processing. In this regard, the HRTF filters multiple audio data signals that may be interpreted as arriving from multiple desired directions. In this regard, HRTFs filters (e.g., finite impulse response filters (FIR)) may be utilized for the left and right ear which may provide the filtering of an audio/sound source (x(t)) before it is perceived at the left and right ears as $x_L(t)$ and $x_R(t)$, respectively.

In the exemplary embodiment of FIG. 6, a pair (e.g., one for the left and right ears) of HRTF filters may be utilized for each item of media content (e.g., media content 89, 91 and 93) on the display 85 of apparatus 50. As such, three pairs of HTRF filters may be utilized for example to separately filter the media content (e.g., media content 89, 91 and 93) for each corresponding direction of audio data. The result of the filtering may be added by the 3D audiovisual renderer 78 to generate a composition of the audio data associated with the media content (e.g., media content 89, 91 and 93) shown on display 85. The composition of the audio data may be provided by the 3D audiovisual renderer 78 to the headphones 105 for rendering or playing of the audio data.

In alternative exemplary embodiment, when a speaker 87 such as for example a loudspeaker of the apparatus 50 is utilized to play the audio data, a stereo widening algorithm may be utilized by the 3D audiovisual renderer 78 to render the audio data associated with the media content (e.g., media content 89, 91 and 93). Additionally, when a speaker 87 such as for example a multi loudspeaker of the apparatus 50 is utilized to play audio data, a multi channel rendering technique may be applied by the 3D audiovisual renderer 78 to render the audio data associated with the media content.

It should be pointed out that it may be beneficial to place the items of media content (e.g., media content 89, 91 and 93) shown on display 85 on a virtual circle 103 around the user, particularly with respect to listening to audio data via headphones or earphones 105 since listener fatigue is reduced significantly when the audio sources are externalized from the head of a user/listener. Furthermore, it should be noted that due to potential front-back confusion of the user, although possible, it may not necessarily be feasible to render audio data behind the user since the selection of items of media content appearing behind the user may also be difficult to achieve.

In an exemplary embodiment, it should be pointed out that the number of virtual audio sources associated with audio data as well as the graphical representations of media content on the display 85 may be limited to a small number such as for example three or four since a higher number of virtual audio sources may be difficult to listen to simultaneously even when the audio sources are rendered in different directions. However, in an alternative exemplary embodiment more than three or four virtual audio sources may be provided without departing from the spirit and scope of the invention.

It should be pointed out that the user of apparatus 50 may select an item of desired media content (e.g., media content 91) by double clicking (or single clicking) on the graphical representation of the item of media content on the display 85 or any other suitable manner of selecting the item of media content. For example, the user may also use other modalities or gestures detected for example by an accelerometer to select an item of media content in a certain direction, position or location of the display 85. Alternatively, the user may utilize a pointing device, finger or the like to click anywhere on the display 85 or press a selection button on a keypad of the user interface 72 in which case the item of media content in the middle of the display 85 may be selected. It should be pointed out that selection of media content on the display 85 stops the playing of audio data associated with media content on the left and right sides of the display 85 while the selected media content may continue to play. In this regard, 3D audiovisual renderer 78 may gradually attenuate the energy levels of the audio data/signals (e.g., directional audio signals) associated with the non-selected media content (e.g., the media content on the left and right of the display 85. By gradually attenuating the energy levels of the audio associated with the audio data signal of the non-selected media content, the corresponding audio is faded out. In some exemplary embodiments, the fading out the audio associated with the audio data signal of the non-selected media content may also include moving or gradually changing the direction of arrival of the audio being faded out. This may enable, for example, an effect in which the non-selected audio items appear to disappear to the left, right, up, down, or any other suitable direction. As referred to herein, directional audio signals may be audio signals having directional components that are output to match or correspond to the direction, position or location of one or more graphical representations of media content on display 85 or not yet shown on the display 85. For example, items of media content may be arranged in a sequential order and may be moved while the user is browsing the media content even though a particular item of media content is not yet shown on the display 85.

Audio Processing

The audio data that may be rendered by the 3D audiovisual renderer 78 may include, but is not limited to, monophonic, stereo or spatial audio data. However, as described above, in an exemplary embodiment, the audio data/content rendered by the 3D audiovisual renderer 78 may be monophonic since processing the monophonic signal with HRTFs or corresponding HRTF filters for left and right output channels may be the least complex approach for rendering audio data. Multi channel content may also be rendered by the 3D audiovisual renderer 78, but it should be pointed out that the corresponding spatial audio data/image associated with the content should typically be narrowed down to enable more than one simultaneous item of audio to be rendered with respect to the media content shown on the display 85 of the apparatus 50, which may decrease the computational load associated with processing audio data.

Referring now to FIG. 7, an exemplary embodiment of a flowchart for facilitating efficient browsing and selection of media content and reducing the computational load of processing audio data is provided. At operation 700, the 3D audio data, or representative audio segments associated with available media content (e.g., media item #1, media item #2, media item #n) may be extracted from a memory (e.g., memory device 76) or database of the apparatus 50 or a remote memory of a network entity (e.g., third communication device 25) such as for example a server. In this regard, the media content extracted from the memory or database by the 3D audiovisual renderer 78 may correspond to an extracted bit stream associated with each item of audio data corresponding to media content such as, for example, media item #1 (e.g., media content 89), media item #2 (e.g., media content 91) and media item #n (e.g., media content 93). The 3D audiovisual renderer 78 may decode the extracted bit streams before performing a downmix (e.g., monophonic downmix) or generation of a "narrow" spatial image.

At operation 705, the 3D audiovisual renderer 78 may downmix multi channel audio data to monophonic signals or any other selected "narrow" spatial audio format. (See e.g., operation 705) As referred to herein downmix may be a mechanism in which a number of distinct audio channels may be mixed together to produce a lower number of channels. In this regard a downmix audio signal may correspond to a simplified audio signal. In instances in which the audio data associated with the extracted bit streams may be originally coded with a parametric stereo or multi channel codec, the encoded monophonic or stereo downmix may already be available in the bit stream and as such the 3D audiovisual renderer 78 may decode the downmix bit stream during operation 705. In this regard, the associated 3D parameterizations may be used by the 3D audiovisual renderer 78 during a 3D rendering stage (e.g., operation 715 below).

At operation 710, the items of media content appearing in the display 85 corresponding to the graphical items of the media content may be selected by the 3D audiovisual renderer 78 for 3D rendering. In this regard, it should be pointed out that only the selection of active audio items may be rendered by the 3D audiovisual renderer 78 at this stage in order to conserve the computational complexity of the 3D audiovisual renderer 78 and/or processor 70. In other words, only the audio data associated with media content that is shown on display 85 that are being played are processed by the 3D audiovisual renderer 78.

At operation 715, the 3D audiovisual renderer 78 perform 3D rendering of audio data/signals (e.g., directional audio signals). In this regard, the 3D audiovisual renderer 78 may receive information regarding the desired location, position or direction of the items of media content based on the location of the corresponding graphical items (e.g., media content 89, 91 and 93) on the display 85. The 3D audiovisual renderer 78 may utilize the received information to generate one or more directional audio signals associated with direction, position and location information in the received information. The 3D audiovisual renderer 78 may also select the 3D parameterizations, such as HRTF filter coefficients as well as a spatial audio (e.g., multi-channel audio) parameterization modification scheme such as binaural cue coding (BCC) or a stereo widening algorithm may be selected based on the desired location or direction of a corresponding audio source (e.g., virtual audio source 97, 99, 101). It should be pointed out that a single HRTF filter pair may be utilized by the 3D audiovisual renderer 78 to render the monophonic audio data for listening to the audio data of the directional audio signals associated with media content via headphones or earphones 105. When the source consists of more than one input channel, the number of HRTF filtering stages may be increased by the 3D audiovisual renderer 78 since each channel may require a filter pair. In this regard, the 3D audiovisual renderer 78 may utilize the HRTF filters to perform an upmix operation on the monophonic signals which may generate two signals from the monophonic signal. For instance, one of the two generated signals may be for a left channel and the other signal of the two generated signals may be for a right channel. The monophonic signal is filtered with the HRTF filter corresponding to a transfer function from the desired 3D location to the user's left ear to create the left hand side channel, while the right hand channel is created by filtering the monophonic signal with the HRTF filter corresponding to the transfer function from the desired location to the right ear.

Additionally, binaural cue coding may be utilized by the 3D audiovisual renderer 78 to render multi-channel spatial audio data (e.g., stereo data using two or more audio channels) for listening to audio data associated with media content via one or more speakers 87 such a loudspeaker(s). Moreover, a stereo widening algorithm may also be utilized by the 3D audiovisual renderer 78 to render multi-channel spatial audio data for listening to audio data associated with media content via one or more loudspeakers of speakers 87. At operation 720, the 3D rendered audio data (e.g., multi channel directional audio signals) may be provided, by the 3D audiovisual renderer 78, to a mixer and mixed together to generate a combined audio signal. In this regard, the 3D audiovisual renderer 78 may mix the 3D rendered audio and output the data correspond to the combined audio signal to one or more speakers 87 and/or headphones 105 for playback so that a user of the apparatus 50 may listen to audio data (e.g., 3D audio data) associated with media content (e.g., media item #1, media item #2 and media item #n) simultaneously.

In an exemplary embodiment, all the audio data for a left channel may be added together by the 3D audiovisual renderer 78 performing the functions of the mixer described above and all the audio data for a right channel may be added together by the 3D audiovisual renderer 78 performing the functions of the mixer. As such, the 3D audiovisual renderer 78 may generate one audio signal for a left ear corresponding to a left channel and one audio signal for a right ear corresponding to a right channel and the audio signals for the left and right channels may be played by one or more speakers such as for example headphones 105.

It should be pointed out that the audio data selection and 3D rendering by the 3D audiovisual renderer 78 may be a continuous process. In this regard, the items of media content that are selected for rendering may be changed or modified as the user of the apparatus 50 is browsing media content via display 85, for example when new items of media content appear on the display 85 and old items of media content disappear from the display 85. Similarly, the location or direction of the items of media content selected for 3D rendering may be constantly updated during the process of 3D rendering of the audio data (See e.g., operation 710), by the 3D audiovisual renderer 78, when the locations of the items of media content (e.g., media content 89, 91 and 93) shown on display 85 are being changed or moved.

In an alternative exemplary embodiment, the 3D audiovisual renderer 78 may add one or more reverb, diffuse and room effect components to the audio data that is rendered with HRTF filtering. The 3D audiovisual renderer 78 may add the reverb, diffuse and room effect component(s) to the audio data that is rendered with HRTF filtering during operation 715, for example. In this regard, the items of media content appearing in the middle (e.g., media content 91) of the display 85 may be rendered as dry directional sounds while the items of media content appearing on the left (e.g., media content 89) and right (e.g., media content 93) sides of the display 85 may be rendered with a reverb or diffuse component(s), for example. By providing the items of media content shown on display 85 with reverb, diffuse and/or room effect component (s), the user of the apparatus 50 may be better able to distinguish the accurately positioned item of media content in the middle of the display 85 for example. Furthermore, the diffuse and/or reverb components added to the audio data associated with the items of media content on the left and right sides of the display 85 may enlarge the corresponding spatial images making the associated audio data more pleasant to listen to.

Low Complexity 3D Rendering of Content

In the exemplary embodiment, the audio data and audio segments associated with media content that are selected by the 3D audiovisual renderer 78 for 3D rendering (for e.g., during operation 715) may be specially tailored. For instance, as described above, the original stereo or multi channel audio content may be downmixed to monophonic (also referred to herein as mono) to lower the complexity of the rendering. Additionally, the original stereo or multi channel audio content may be downsampled to lower the sampling rate of the audio data that may already be applied at the database or memory (e.g., memory device 76) of the apparatus 50 or a remote memory of a network entity (e.g., third communication device 25).

It should be pointed out that the complexity of the 3D rendering may be optimized by utilizing binaural cue coding (BCC) parameterizations. For instance, instead of utilizing high order HRTF filters, the 3D audiovisual renderer 78 may pan the audio data into a 3D image using inter channel level difference (ILD) and inter-channel time difference (ITD) based parameterization(s). Additionally, decorrelation may be used by the 3D audiovisual renderer 78 to create additional diffuse sources in the audio data associated with media content on the left and right sides of the display 85.

When the original multi channel content is already coded with a BCC type of parameterization, the decoded parameters may be reused in the 3D rendering of the audio data. The ILD and ITD coefficients of the corresponding mono (or stereo) downmix may be modified by the 3D audiovisual renderer 78 to narrow the corresponding audio data down and position the audio data in a desired location(s), position(s) or direction(s) in a 3D image associated with the audio data. In order to narrow the spatial image of the audio item, the variation (e.g., dynamics) of ILD and ITD parameterization may be lowered by the 3D audiovisual renderer 78 by using a mapping or limiter function, or by setting the ILD and ITD parameterization to zero and as such a constant level and delay component may be added to the audio data to enable panning of the source in a desired direction(s). That is, the operation consists of narrowing the spatial audio image and repanning the location in a different direction(s). For example, in instances of binaural headphone listening, a downmix (e.g., monophonic downmix) may be rendered in 3D (e.g., binaural) space, by the 3D audiovisual renderer 78, in each subband n using ILD and ITD as follows:

$$S_n^L = 2 \frac{10^{\frac{\Delta L_n}{20}}}{10^{\frac{\Delta L_n}{20}} + 1} S_n e^{-j\frac{2\pi n \tau_n}{2N}} \quad (1)$$

$$S_n^R = 2 \frac{1}{10^{\frac{\Delta L_n}{20}} + 1} S_n e^{j\frac{2\pi n \tau_n}{2N}}, \quad (2)$$

where $S_n$ is the discrete fourier transform (DFT) spectral coefficient vector of the downmixed signal in subband n, $S_n^L$ and $S_n^R$ are the spectral coefficients of left and right 3D rendered signal for headphone listening, respectively. The spatial image may be narrowed down by the 3D audiovisual renderer 78 by replacing the ILD $\Delta L_n$ and ITD $\tau_n$ with for example $\Delta \tilde{L}_n = \alpha \Delta L_n$ and $\Delta \tilde{\tau}_n = \alpha \Delta \tau_n$ such that $\alpha < 1$. It should be pointed out that $\alpha$ is a parameter that may be adapted to achieve the desired level of panning. When the value of $\alpha$ is zero, the output of the rendering in Equations 1 and 2 is typically omitted, for example, since the left and right channels are identical. When the value of $\alpha$ is increased, the output becomes closer to the actual binaural representation. Moreover, it should be pointed out that according to an exemplary embodiment of the invention, the value of $\alpha$ is identical for both level and delay parameters. In another exemplary embodiment, different values of $\alpha$ may be used for modifying the ILD and ITD cues, denoted for example $\alpha_l$ and $\alpha_t$, respectively. The constant coefficient may be replaced, by the 3D audiovisual renderer 78, for example with a function that limits the higher values of BCC coefficients in similar manner to a logarithmic function. (It should be noted, however, that a logarithm function as such may not be suitable since the handling of values <1 may not be correct for this purpose. Similar panning modifications may also be generated for stereo widening or multi channel playback with respect to listening to audio via a loudspeaker(s).)

The panning of a sound source in a desired direction(s) may be performed, by the 3D audiovisual renderer 78, by adding a constant off set derived for example from the panning law when the desired direction of arrival is known. The ITD off set may be determined from the function $\tau_0 = (|x|\sin(\phi))/c$, where $|x|$ is the distance between a loudspeaker(s) or headphones (e.g., diameter of the head) and c is the speed of sound. The ILD off set $\Delta L_0$ may be calculated, by the 3D audiovisual renderer 78, using the panning law $\sin \phi = (l_1 - l_2)/(l_1 + l_2)$, where $l_i = \sqrt{x_i(n)^T x_i(n)}$ of channel i, and knowing that ILD is determined as $\Delta L_n = 10 \log_{10}(x_1(n)^T x_1(n)/x_2(n)^T x_2(n))$.

As a result, the modified BCC parameterization is for example written as $$\Delta \tilde{L}_n = \alpha \Delta L_n + \Delta L_0 \quad (3)$$

$$\Delta \tilde{\tau}_n = \alpha \tau_n + \tau_0. \quad (4)$$

where $\Delta \tilde{L}_n$ is a level difference (e.g., a level difference coefficient/parameterization) that may be added to audio data for 3D rendering and $\Delta \tilde{\tau}_n$ is the time difference (e.g., a time difference coefficient/parameterization) that may be added to audio data for 3D rendering. In this regard, the modified BCC parameters, $\Delta \tilde{L}_n$ and $\Delta \tilde{\tau}_n$, may be used in Equations (1) and (2).

Additionally, it should be pointed out that the sound sources placed in the side of the 3D audio image may further be diffused (e.g., decorrelated), by the 3D audiovisual renderer 78, by adding a small random component to the ILD and ITD parameterization described above. In this regard, the modified BCC parameterization may be used by the 3D audiovisual renderer 78 when performing the 3D rendering (e.g., operation 715 of FIG. 7) of the audio data associated with media content (e.g., media content 89, 91 and 93) shown on display 85, according to the exemplary embodiments.

Smooth Start of the Media Playback

According to the exemplary embodiments, when an item of media content is selected for playback by a user of the apparatus, the audio associated with the media content may start to play seamlessly without any artifacts or distortion, which may be advantageous and beneficial for the experience of the user of the apparatus 50. In this regard, the 3D audiovisual renderer 78 may continue to playback the audio data (e.g., song) associated with the selected item of media content (e.g., media content 89 corresponding to an image of an album cover) while the audio data associated with the items of media content (e.g., media content 91 and 93) that are not selected may be gradually faded away (e.g., gradually attenuating the corresponding energy levels) so that the audio no longer plays. In this manner, the 3D audiovisual renderer 78 which may render several simultaneous audio data sources may be converted to true media playback.

According to the exemplary embodiments, when an item of media content is selected by the user of the apparatus 50 for playback, the original monophonic, stereo or multi channel rendering of the audio data associated with the selected media content may be restored by the 3D audiovisual renderer 78 by interpolating the HRTF filtering coefficients of the corresponding 3D rendered audio data during a predetermined time window (also referred to herein as predetermined time period) such as for example 500 ms (e.g., half a second). In this regard, 500 ms after the user performs the selection of the item of media content, the audio data associated with the selected item of media content may be restored, by the 3D audiovisual renderer 78, to the spatial image of the original or authentic audio data/signal that was extracted from the database or memory (e.g., memory device 76) of the apparatus 50 or the remote memory of the network entity (e.g., third communication device 25). In an exemplary embodiment, the 3D audiovisual renderer 78 may restore the original signal associated with a selected it of media content by gradually changing the HRFT filter coefficients applied during 3D rendering to transition a respective directional audio signal of the above described combined audio signal (see e.g., operation 720 above) to the original audio signal.

In another exemplary embodiment, when the user of the apparatus 50 selects an item of media content (e.g., media content 93) shown on display 85, the 3D audiovisual renderer 78 may move the item of selected media content to the middle/center of the display 85 by selecting a corresponding HRTF filter in step-by-step manner. For example, when an item of stereo audio data intended for loudspeaker playback is rendered for listening to the audio data via headphones (e.g., headphone 105) using HRTF filtering, the 3D audiovisual renderer 78 may interpolate the corresponding HRTF coefficients towards the intended parameterization within the predetermined time window (e.g., 500 ms). In this regard, the final state of the interpolation is the original representation of the selected audio content while the starting point is the monophonic content that is HRTF filtered for left and right channel. The audio content downmix may be split into multi channel audio. For example, in instances related to a stereo signal, the downmix may be split into a narrow stereo image which may be gradually extended to true stereo by the 3D audiovisual renderer 78.

$$L_{new} = \alpha L_{orig} + (1-\alpha) R_{orig} \quad (3)$$

$$R_{new} = \alpha R_{orig} + (1-\alpha) L_{orig}. \quad (4)$$

where $\alpha=0.5$ is the starting point. The parameter $\alpha$ is gradually, within the predetermined time window, increased towards unity. It should be pointed out that the 3D audiovisual renderer 78 may gradually increase the parameter $\alpha$ towards unity within the predetermined time window (e.g., 500 ms). Hence, in the end, the output corresponds to the original stereo signal. Now, the HRTF filtering may also be split. The new left and right channels need to be rendered separately with a HRTF filter pair. The left channel is gradually, within the predetermined time window, rendered towards left, and the right channel towards right. In addition, the HRTF filter coefficients, when implemented as FIR, may be flattened during the predetermined time window by forcing the first FIR coefficient towards unity and the rest of the FIR coefficients towards zero. After the expiration of the predetermined time window, the 3D audiovisual renderer 78 may restore the conventional playback of the corresponding audio data using the predetermined rendering scheme of the original audio data. In this regard, the predetermined rendering scheme may be the representation of the original audio data without any additional processing.

In an alternative exemplary embodiment, it should be pointed out that HRTF based rendering may be converted by the 3D audiovisual renderer 78 to a BCC coefficient based rendering by analyzing the HRTF filter pair frequency response regarding the level and phase differences on a subband basis, and extracting corresponding BCC coefficients for each subband. In this regard, when the BCC coefficients of the original audio associated with media content (e.g., media content 89, 91 and 93) are known from the corresponding bit stream, the 3D audiovisual renderer 78 may interpolate the HRTF based BCC coefficients gradually towards the original parameterization. In this regard the rendered audio data may be restored to its original audio data.

Alternatively, the 3D audiovisual renderer 78 may cross fade the rendered audio data, associated with an item of media content, with the original audio data stored in the database or memory of the apparatus 50 or a remote memory of a network entity (e.g., third communication device 25). In this regard, during the predetermined time window, the 3D audiovisual renderer 78 may replace the rendered item of audio data with the corresponding original audio data. This may be particularly beneficial when the 3D audio data is rendered by the 3D audiovisual renderer 78 with a different scheme as compared to the original audio data. For example, instead of interpolating between subband domain BCC coefficients and HRTF filter coefficients, it may be easier for the 3D audiovisual renderer 78 to cross fade the filtered audio signal with the original audio data (or a corresponding signal associated with the original audio data).

When the modified BCC parameterization of Equations (3) and (4) are utilized to render audio data (e.g., 3D audio data) associated with the media content (e.g., media content 89, 91 and 93) of the exemplary embodiments, the corresponding audio data may be restored to its original audio data (when a user selects a corresponding item of media content on the display 85) in an efficient manner. For instance, when the BCC coefficients of the original audio bit stream were modified as described above in the previous section, the restoration to the original BCC decoding may be performed by the 3D audiovisual renderer 78 by gradually removing the limiting function and the BCC off set(s) from Equations (3) and (4) during the predetermined time window.

It should be pointed out that FIG. 7 is a flowchart of a system, method and computer program product according to exemplary embodiments of the invention. It will be understood that each block or step of the flowchart, and combinations of blocks in the flowchart, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory device 76) and executed by a processor (e.g., processor 70, 3D audiovisual renderer 78). As will be appreciated, any such computer program instructions may be loaded onto a computer or other programmable apparatus (e.g., hardware) to produce a machine, such that the instructions which execute on the computer or other programmable apparatus cause the functions specified in the flowchart blocks or steps to be implemented. In some embodiments, the computer program instructions are stored in a computer-readable memory that can direct a computer or other programmable apparatus to function in a particular manner, such that the instructions stored in the computer-readable memory produce an article of manufacture including instructions which implement the function specified in the flowchart blocks or steps. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart blocks or steps.

Accordingly, blocks or steps of the flowchart support combinations of means for performing the specified functions and combinations of steps for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

In an exemplary embodiment, an apparatus for performing the method of FIG. 7 above may comprise a processor (e.g., the processor 70) configured to perform some or each of the operations (700-720) described above. The processor may, for example, be configured to perform the operations (700-720) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (700-720) may comprise, for example, the processor 70 (e.g., as means for performing any of the operations described above), the 3D audiovisual renderer 78 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    obtaining a plurality of directional audio signals corresponding to a plurality of items of media data, wherein each of the plurality of directional audio signals is based on a respective original audio signal and wherein each of the plurality of directional audio signals has a direction or location in an audio space corresponding to the location or direction of the respective item of media data;
    combining the plurality of directional audio signals to obtain a combined audio signal; and
    modifying, in response to a selection of at least one of the items of media data, the combined audio signal by fading out audio associated with the non-selected items of media data and by converting audio associated the selected item of media data to the respective original audio signal upon expiration of a predetermined time period.

2. The method of claim 1, wherein obtaining the plurality of directional audio signals comprises:
    obtaining a plurality of original audio signals corresponding to a plurality of items of media data;
    determining one or more directions or locations in an audio space corresponding to one or more directions or locations of the respective items of media data; and
    performing three-dimensional (3D) rendering of the plurality of original audio signals by applying at least one 3D parameterization to each of the plurality of original audio signals to generate a plurality of directional audio signals corresponding to the plurality of items of media data.

3. The method of claim 2, wherein performing the 3D rendering comprises:
    determining whether one or more of the plurality of original audio signals are multi-channel audio signals in order to determine whether to generate respective simplified audio signals;
    generating a simplified audio signal in response to determining that the respective original audio is a multi-channel audio signal, wherein the simplified audio signal comprises a fewer number of audio channels than the original audio signal; and
    applying at least one 3D parametrization to the simplified audio signal to generate a respective directional audio signal.

4. The method of claim 2, wherein generating the simplified audio signal comprises downmixing the multi-channel audio signal to produce a respective monophonic audio signal.

5. The method of claim 2, wherein performing the 3D rendering comprises:
    applying one or more head-related transfer function (HRTF) filter coefficients to each of the plurality of original audio signals to generate a plurality of directional audio signals.

6. The method of claim 2, wherein performing the 3D rendering comprises:
    applying at least level difference and time difference binaural cue coding (BCC) parameters to each of the plurality of original audio signals to generate a plurality of directional audio signals.

7. The method of claim 1, further comprising adding at least one of a reverb component, a diffuse component or a room effect component to the audio data associated with at least one of the directional audio signals.

8. The method of claim 1, wherein:
    fading out comprises gradually attenuating the energy levels of directional audio signals of the combined audio signal that are associated with the non-selected items of media data; and
    converting the audio associated with the selected item of media data comprises gradually changing the HRTF filter coefficients to transition the directional audio signal to the respective original audio signal.

9. The method of claim 1, wherein a plurality of visual identifiers associated with respective items of the media data are currently shown on a display.

10. An apparatus comprising:
at least one processor; and
at least one memory including computer program code, the at least one memory and the computer program code configured to, with the at least one processor, cause the apparatus to perform at least the following:
obtain a plurality of directional audio signals corresponding to a plurality of items of media data, wherein each of the plurality of directional audio signals is based on a respective original audio signal and wherein each of the plurality of directional audio signals has a direction or location in an audio space corresponding to the location or direction of the respective item of media data;
combine the plurality of directional audio signals to obtain a combined audio signal; and
modify, in response to a selection of at least one of the items of media data, the combined audio signal by fading out audio associated with the non-selected items of media data and by converting audio associated with the selected item of media data to the respective original audio signal upon expiration of a predetermined time period.

11. The apparatus of claim 10, wherein the at least one memory and the computer program code are further configured to, with the at least one processor, cause the apparatus to:
obtain the plurality of directional audio signals by obtaining a plurality of original audio signals corresponding to a plurality of items of media data, by determining one or more directions or locations in an audio space corresponding to one or more directions or locations of the respective items of media data, and by performing three-dimensional (3D) rendering of the plurality of original audio signals by applying at least one 3D parameterization to each of the plurality of original audio signals to generate a plurality of directional audio signals corresponding to the plurality of items of media data.

12. The apparatus of claim 11, wherein the at least one memory and the computer program code are further configured to, with the at least one processor, cause the apparatus to:
perform the 3D rendering by determining whether one or more of the plurality of original audio signals are multi-channel audio signals in order to determine whether to generate respective simplified audio signals by generating the plurality of simplified audio signals in response to determining that the audio signals correspond to multi-channel audio signals, wherein the simplified audio signals comprises a fewer number of audio channels than the multi-channel audio signals, and by applying at least one 3D parametrization to the simplified audio signal to generate a respective directional audio signal.

13. The apparatus of claim 12, wherein the at least one memory and the computer program code are further configured to, with the at least one processor, cause the apparatus to:
generate the simplified audio signals by downmixing the multi-channel audio signal to produce a respective monophonic audio signal.

14. The apparatus of claim 11, wherein the at least one memory and the computer program code are further configured to, with the at least one processor, cause the apparatus to:
perform the 3D rendering by applying one or more head-related transfer function (HRTF) filter coefficients to each of the plurality of original audio signals to generate a plurality of directional audio signals.

15. The apparatus of claim 11, wherein the at least one memory and the computer program code are further configured to, with the at least one processor, cause the apparatus to:
perform the 3D rendering by applying at least level difference and time difference binaural cue coding (BCC) parameters to each of the plurality of original audio signals to generate a plurality of directional audio signals.

16. The apparatus of claim 10, wherein the at least one memory and the computer program code are further configured to, with the at least one processor, cause the apparatus to:
add at least one of a reverb component, a diffuse component or a room effect component to the audio data associated with at least one of the directional audio signals.

17. The apparatus of claim 10, wherein the at least one memory and the computer program code are further configured to, with the at least one processor, cause the apparatus to:
fade out the audio by gradually attenuating the energy levels of directional audio signals, of the combined audio signal, that are associated with the non-selected items of the media data; and
convert the audio associated with the selected item of media data by gradually changing the HRTF filter coefficients to transition the directional audio signal to the respective original audio signal.

18. The apparatus of claim 10, wherein a plurality of visual identifiers associated with respective items of the media data are currently shown on a display.

19. A computer program product comprising at least one non-transitory computer-readable storage medium having computer-executable program code instructions stored therein, the computer-executable program code instructions comprising:
program code instructions for obtaining a plurality of directional audio signals corresponding to a plurality of items of media data, wherein each of the plurality of directional audio signals is based on a respective original audio signal and wherein each of the plurality of directional audio signals has a direction or location in an audio space corresponding to the location or direction of the respective item of media data;
program code instructions for combining the plurality of directional audio signals to obtain a combined audio signal; and
program code instructions for modifying, in response to a selection of at least one of the items of media data, the combined audio signal by fading out audio associated with the non-selected items of media data and by converting audio associated with the selected item of media data to the respective original audio signal upon expiration of a predetermined time period.

20. The computer program product of claim 19, wherein obtaining the plurality of directional audio signals comprises:
obtaining a plurality of original audio signals corresponding to a plurality of items of media data;
determining one or more directions or locations in an audio space corresponding to one or more directions or locations of the respective items of media data; and
performing three-dimensional (3D) rendering of the plurality of original audio signals by applying at least one 3D parameterization to each of the plurality of original audio signals to generate a plurality of directional audio signals corresponding to the plurality of items of media data.

21. The computer program product of claim 20, wherein performing the 3D rendering comprises:

determining whether one or more of the plurality of original audio signals are multi-channel audio signals in order to determine whether to generate respective simplified audio signals;

generating the plurality of simplified audio signals in response to determining that the audio signals correspond to multi-channel audio signals, wherein the simplified audio signals comprises a fewer number of audio channels than the multi-channel audio signals; and applying at least one 3D parametrization to the simplified audio signal to generate a respective directional audio signal.

22. The computer program product of claim 19, wherein a plurality of visual identifiers associated with respective items of the media data are currently shown on a display.

23. The computer program product of claim 20, wherein generating the simplified audio signal comprises downmixing the multi-channel audio signal to produce a respective monophonic audio signal.

* * * * *